United States Patent [19]
Taniguchi et al.

[11] Patent Number: 5,254,053
[45] Date of Patent: Oct. 19, 1993

[54] FIVE-SPEED AUTOMATIC TRANSMISSION

[75] Inventors: Takao Taniguchi, Okazaki; Kazumasa Tsukamoto, Toyota; Masahiro Hayabuchi; Masanori Kadotani, both of Anjo; Masahiko Ando, Okazaki; Yasuo Hojo, Nagoya; Seitoku Kubo, Toyota; Yutaka Taga; Hidehiro Oba, both of Aichi, all of Japan

[73] Assignees: Aisin AW Co., Ltd.; Jidosha Kabushiki Kaisha Toyoda, both of Japan

[21] Appl. No.: 964,631

[22] Filed: Oct. 23, 1992

[30] Foreign Application Priority Data

Oct. 29, 1991 [JP] Japan .................................. 3-308340

[51] Int. Cl.$^5$ .............................................. F16H 3/62
[52] U.S. Cl. ...................................................... 475/276
[58] Field of Search ...................................... 475/276

[56] References Cited

U.S. PATENT DOCUMENTS

| | | | |
|---|---|---|---|
| 3,225,627 | 12/1965 | Christenson | 475/276 |
| 3,267,769 | 8/1966 | Tuck et al. | 475/276 X |
| 3,313,183 | 4/1967 | Bailey et al. | 475/276 X |
| 3,941,013 | 3/1976 | Miller | 475/276 |

OTHER PUBLICATIONS

Automobiltechische Zeitschrift 91, 1989 Sep. pp. 445–447.

Primary Examiner—Dirk Wright
Attorney, Agent, or Firm—Lorusso & Loud

[57] ABSTRACT

A five-speed automatic transmission includes a main transmission and an over-drive transmission of a front disposition type. The main transmission includes three sets of planetary gears, a clutch for engaging and disengaging speed-change elements of the planetary gear sets, and a brake for fixing and releasing the speed change elements, and provides for four forward speed ranges and one reverse speed range. In the over-drive transmission of a front disposition type, a speed change element of an over-drive planetary gear set connected to an input element of the main transmission is adapted to be engaged, disengaged and fixed for achieving either a directly coupled stage or an over-drive stage. The over-drive transmission releases the direct coupling for reverse driving operation. One of the clutches of the main transmission for achieving the directly coupled stage and one of the brakes for achieving the low speed stage are engageable in the reverse driving operation.

1 Claim, 5 Drawing Sheets $\lambda_0 = 0.326 \quad \lambda_1 = 0.530 \quad \lambda_2 = 0.419 \quad \lambda_3 = 0.424$

| | C-0 | C-1 | C-2 | B-0 | B-1 | B-2 | B-3 | B-4 | B-5 | F-0 | F-1 | F-2 | F-3 | Gear Ratio | Step |
|---|---|---|---|---|---|---|---|---|---|---|---|---|---|---|---|
| P | | | | O | | | | | | | | | | — | |
| REV | | | O | O | | | | O | | | | | | 3.470 | |
| N | | | | O | | | | | | | | | | — | |
| 1ST | O | O | | | | | | | (O) | O | | O | | 3.357 | 1.52 |
| 2ND | O | O | | | | | (O) | O | | O | O | | | 2.208 | 1.56 |
| 3RD | O | O | | | (O) | O | | ⊗ | | O | O | | | 1.418 | 1.42 |
| 4TH | O | O | O | | | ⊗ | | ⊗ | | O | | | | 1.000 | 1.33 |
| 5TH | | O | O | O | | ⊗ | | ⊗ | | | | | | 0.750 | |

( ) : during Braking by Engine
⊗ : Engaged but No Torque Transmission

FIVE-SPEED AUTOMATIC TRANSMISSION

BACKGROUND OF THE INVENTION

1. Field of the Invention

The present invention relates to a five-speed automatic transmission, and in particular, to an automatic transmission including combination of a four-speed main transmission and an over-drive transmission of a front disposition type for achieving the five speed ranges.

2. Description of the Background Art

A five-speed automatic transmission of a type "W5A030" manufactured by Benz Corporation (*Automobilteschnische Zeitschrift* 91, 1989 September, pp 445–447) is a five speed automatic transmission including the combination of a four-speed main transmission provided with three sets of planetary gears and an over-drive transmission. This five-speed automatic transmission includes the combination of a simple four-speed main transmission of a Rabinio type, which does not require switching of inputs, and an over-drive transmission of a rear disposition type, and has such good speed change steps that the gear ratio step decreases as the speed range rises.

The five-speed automatic transmission described above, however, has a disadvantage in that the reverse gear ratio is excessively high. In the above example, although the gear ratio of the first speed range is 3.871, the reverse gear ratio is 5.586. The high reverse gear ratio, which is 1.44 times as large as the first speed gear ratio, excessively increases driving force in reverse driving, which may cause a sudden start sensation, slip of tires, excessive engine braking and other problems. Such problems are particularly troublesome in reverse driving wherein smooth driving requires delicate operation of the accelerator.

Further, in the over-drive transmission section, frictionally engaging elements bear a large torque, leading to an increase in weight and difficulty in controllability. For example, a clutch of the over-drive transmission is required, in the forward first to fourth speed ranges, only to transmit an engine brake torque, but in the reverse driving is required to bear a torque which is increased an amount corresponding to the speed reduction for reverse. As a result, the clutch requires many frictional members for ensuring the required torque capacity, which results in an increase in weight and the potential for excessive engine-braking in forward drive. Therefore, the clutch is additionally provided with a centrifugal hydraulic pressure cancelling mechanism for improving controllability.

Although the reverse gear ratio may be reduced to overcome the above-noted disadvantages, this affects the gear ratios for the forward driving operation, and thereby the gear ratios cannot be set at values maintaining good speed-change steps. Also, while the gear ratio might be reduced by operating the over-drive in reverse, in practice this is impossible because the over-drive transmission includes a one-way clutch for reducing shock and the one-way clutch is locked during operation in the opposite direction.

In view of the above-noted problems, it is an object of the present invention to provide a five-speed automatic transmission, which includes the combination of a main transmission provided with simply coupled three sets of planetary gears and an over-drive transmission, and which achieves a good reverse gear ratio while maintaining appropriate forward speed change steps, and also eliminates excessive torque bearing by respective force transmitting parts, so that the whole automatic transmission has a reduced size and weight and thus is improved in versatility for mounting in a vehicle.

SUMMARY OF THE INVENTION

In order to overcome the above-noted disadvantages, the present invention provides a five-speed automatic transmission including a main transmission, which includes three sets of planetary gears, a clutch for engaging and disengaging speed-change elements of the planetary gears, and a brake for fixing and releasing the speed change elements, and achieves four forward speed ranges and one reverse speed range. The five-speed automatic transmission further includes an over-drive transmission of a front disposition type, in which a speed change element of the over-drive planetary gearing, connected to an input element of the main transmission is adapted to be engaged, disengaged and fixed for achieving either a directly coupled stage or an over-drive stage. The directly coupled stage is released in reverse driving operation, and one of the clutches of the main transmission for achieving the directly coupled stage and one of the brakes for achieving the low speed stage are engaged in reverse.

In the present invention having the construction described above, the four forward ranges of appropriate speed change steps are achieved by the direct coupling within the over-drive transmission of the front disposition type in conjunction with speed change by the main transmission, and the over-drive range and the reverse range are achieved by a speed change by the main transmission in conjunction with a shift of the over-drive transmission to the overdrive stage. In particular, the gear ratio for the reverse driving operation can be set at an appropriate value with respect to the gear ratio for the first forward speed range.

Accordingly, in the present invention, the input to the main transmission in reverse can be reduced in accordance with the over-drive gear ratio, so that it is possible to reduce capacities and strengths required of the clutch and brake of the main transmission, which are related to the reverse driving operation, as well as the capacities and strengths of those members which transmit the reverse driving force. Therefore, the five-speed automatic transmission can have a light and compact construction, and also the clutch related to the reverse driving operation can be easily controlled in forward driving.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
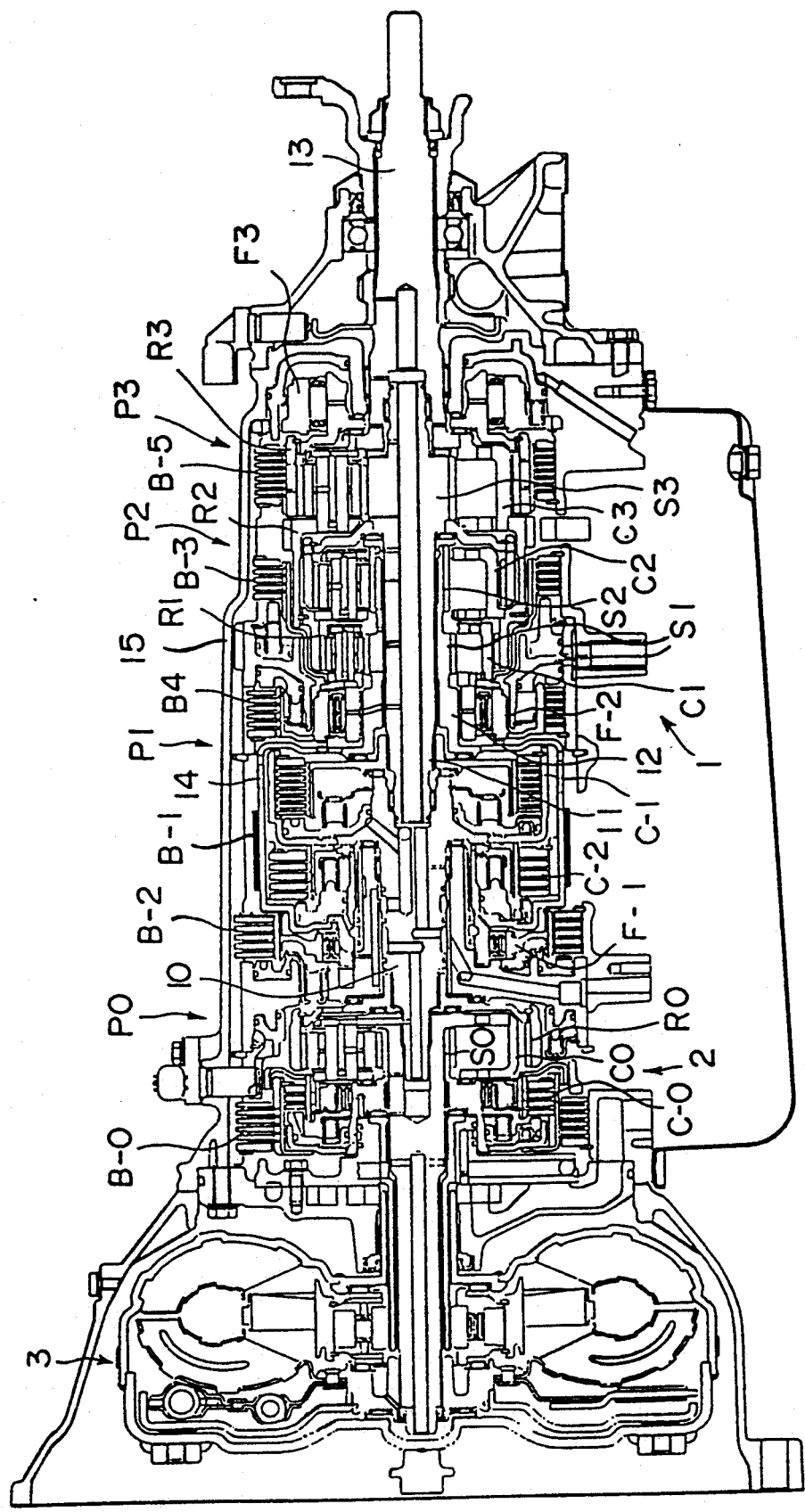
FIG. 1 is a cross-sectional view showing the overall construction of a five-speed automatic transmission of a first embodiment of the present invention.

FIG. 1 shows an embodiment of a five-speed automatic transmission including a main transmission 1, having three sets of planetary gears P1-P3, and clutches C-1, C-2, F-1, F-2 and F-3 for engaging and disengaging speed change elements S-1–S-3, C1–C3 and R-1–R-3 of the planetary gears P1-P3, thus providing four forward speed ranges and one reverse speed range. The five-speed automatic transmission is also provided with an over-drive transmission 2 of a front disposition type, in which a sun gear S0, a carrier C0 and a ring gear R0, i.e. speed change elements of an over-drive planetary gear unit P0 connected to an input shaft 10, i.e. the input to the main transmission 1, are selectively engaged, released and fixed to provide a directly coupled range and an over-drive range. In the over-drive transmission 2 of the front disposition type, the directly coupled range can be released for operation in reverse by releasing or disengaging the clutch C-0. The clutch C-2 in the main transmission, which provides the direct coupling and the brake C-5 which provides the low speed range, can also be engaged in reverse. The over-drive transmission 2 of the front disposition type is connected to an engine (not shown) through a torque converter 3 provided with a lock-up clutch.

More specifically, the main transmission 1 includes the input shaft 10, which is connected to the ring gear R0 of the front disposition type over-drive transmission 2 and is also connected to first and second power transmitting shafts 11 and 12 through multiple disk clutches C-1 and C-2, respectively. Thus, the main transmission 1 includes first and second power transmitting shafts 11 and 12 as well as an output shaft 13. The first power transmitting shaft 11 is axially aligned with the input shaft 10, and is connected to the ring gear R2 of the planetary gear P2 and the sun gear S3 of the planetary gear P3. The second power transmitting shaft 12 is disposed coaxially around the first power transmitting shaft 11, and is connected to the sun gears S1 and S2 of the planetary gears P1 and P2. The output shaft 13 is axially aligned with the second power transmitting shaft 12, and is connected through the carrier C3 of the planetary gear P3 to the ring gear R1 of the planetary gear P1 and the carrier C2 of the planetary gear P2.

The second power transmitting shaft 12 is connected through a drum 14 of the multiple disk clutch C-2 to the multiple disk brake B-2, which engages transmission casing 15 (hereinafter "casing") through the one-way clutch F-1. The drum 14 is engageable with the casing 15 through the band brake B-1. The carrier C1 of the planetary gear P1 is engageable with the casing 15 through the multiple disk brake B-3, and also may be engaged with the casing 15 through the one-way clutch F-2 by the multiple disk brake B-4. The ring gear R3 of the planetary gear P3 is engageable with the casing 15 through the multiple disk brake B-5 and the one-way clutch F-3.

The front disposition type over-drive transmission 2 includes a single planetary gear set P0, of which sun gear S0 and carrier C0 are mutually connected through a multiple disk clutch C-0 and a one-way clutch F-0 mutually disposed in parallel. Further, the sun gear S0 may be engaged with the casing 15 by a multiple disk brake B-0.

Figure 2:
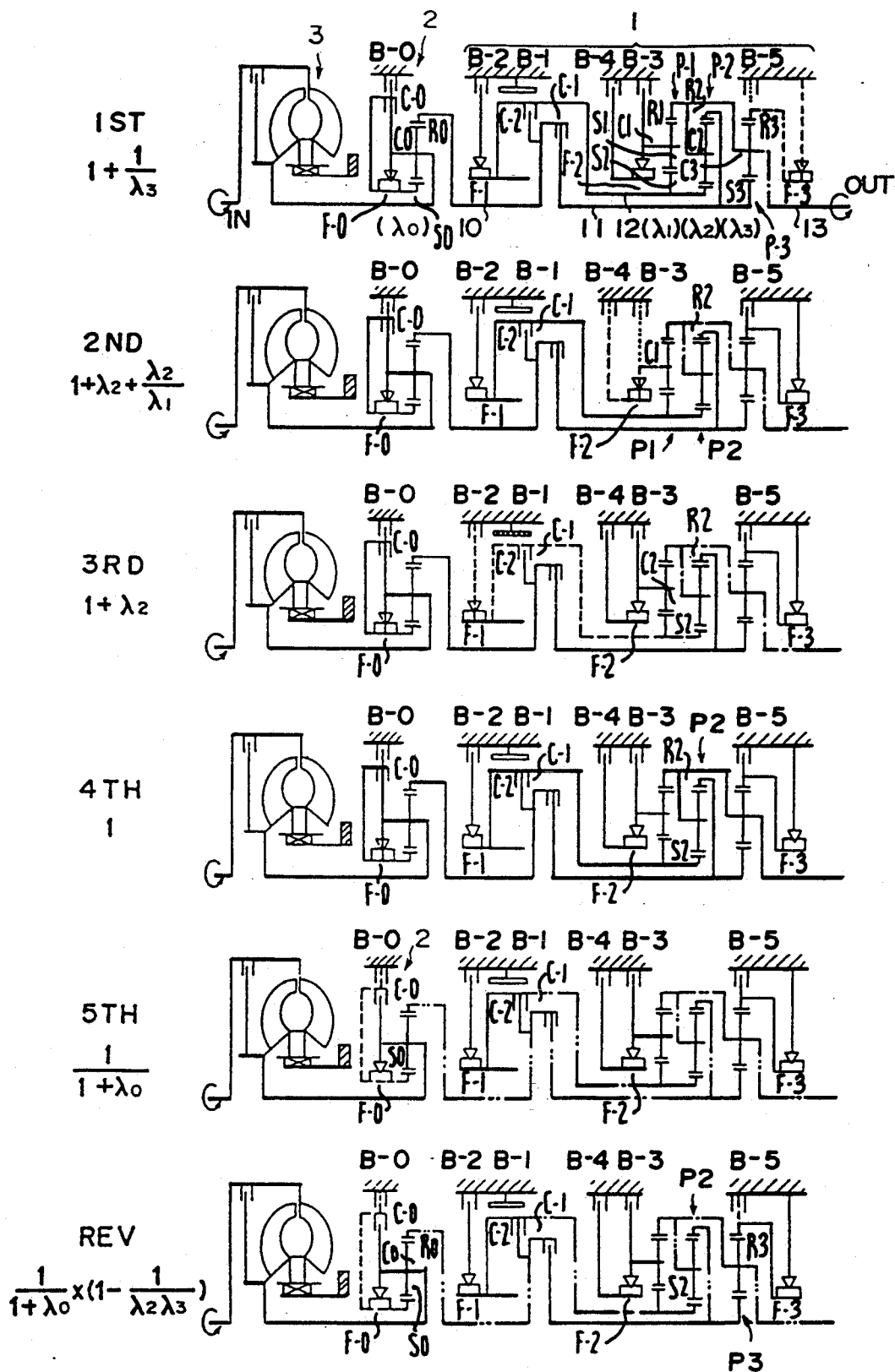
FIG. 2 is a series of schematic diagrams illustrating operation of the first embodiment of FIG. 1 in the different speed ranges.
Figures 3, 4:
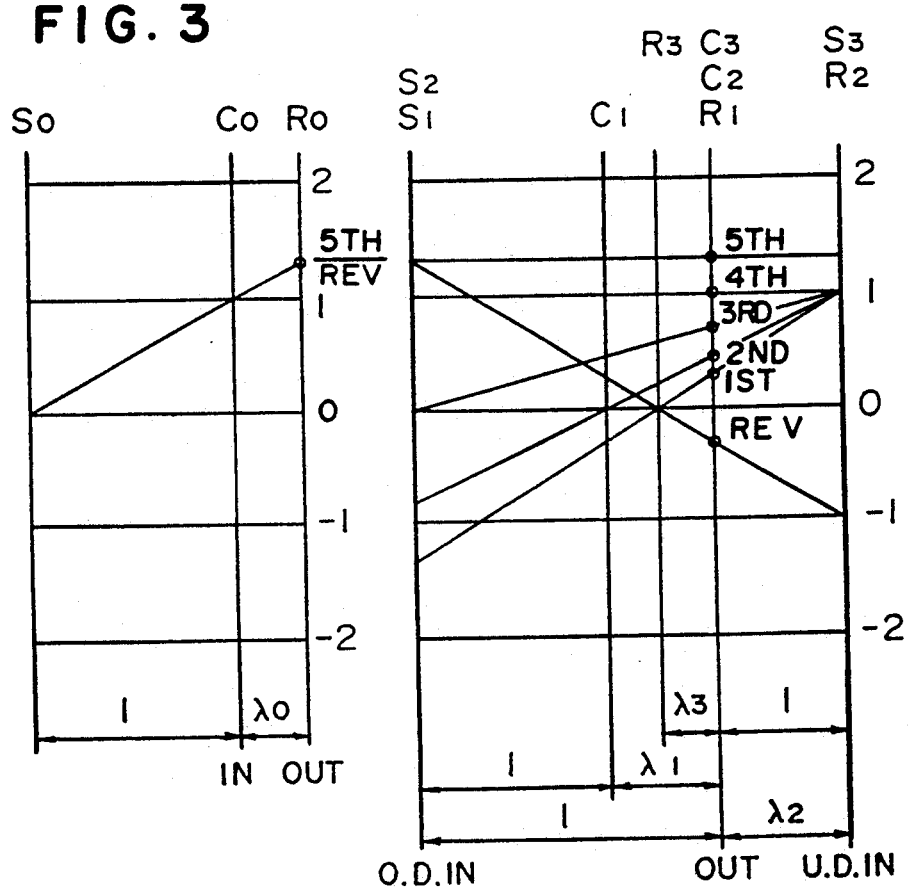
FIG. 3 is a table showing gear ratios for the first embodiment.
FIG. 4 is a speed diagram for the first embodiment.

The five-speed automatic transmission described above operates as follows. In FIG. 2, a thick solid line represents rotation at the same speed as the input rotation, a dashed line represents a stationary or fixed state, a line of alternating long and short dashes represents rotation at a reduced speed, and a line of alternating one long and two short dashes represents rotation at an increased speed. As shown in FIGS. 2-4, in the first speed range (1ST), the clutch C-1 is engaged, and the input is applied to the sun gear S3 of the planetary gear P3, and the first gear ratio is achieved by the single planetary gear P3 through a path which supplies the power to the carrier C3, owing to the one-way clutch F-3 preventing reverse rotation of the ring gear R3. In the second speed range (2ND), the input is applied through the clutch C-1 to the ring gear R2, and is supplied from the planetary gears P1 and P2, owing to the one-way clutch F-2, producing a reaction force in the carrier C1 of the planetary gear P1. In this manner, the second gear ratio is achieved. Similarly, in the third speed range (3RD), the torque is transmitted to the ring gear R2, and then to the carrier C2, owing to the one-way clutch F-1 stopping the sun gear S-2.

In the fourth speed range (4TH), the clutch C-2 is additionally engaged, and the torque is transmitted to the ring gear R2 as well as the sun gear S2. Therefore, the planetary gear P2 is directly connected, and the input rotation is output therefrom without change. In the over-drive range (5TH), the main transmission maintains the same state as the fourth speed range, and the over-drive transmission 2, which was in the directly coupled state in the first to fourth speed ranges, operates to increase the rotational speed by the brake B-0 fixing the sun gear S0.

Operation (REV) of the over-drive transmission in reverse will now be explained. More specifically, the carrier C0 receives the input torque, the sun gear S0 is fixed, and the output torque is output from the ring gear R0. By setting the over-drive gear ratio in this manner, the torque is transmitted through the clutch C-2 in the rear position to the sun gear S2, and the reverse gear ratio is achieved by the planetary gears P2 and P3, while fixing the ring gear R3.

In the above-illustrated embodiment, the speed change steps in forward driving are appropriately set and, further, the reverse gear ratio can have an appropriately reduced value, as shown in FIGS. 3 and 4. Moreover, in reverse the input torque to the main transmission 1 is reduced proportionately to the increase in speed achieved by the over-drive transmission 2. Therefore, owing to the reduction of the transmitted torque in the main transmission during reverse operation, the torque transmitting capacities of the clutch C-2 and brake B-5, which are increased merely for reverse operation in the conventional over-drive of the rear disposition type, can be reduced to essentially those required for their forward drive functions. Further, the capacities and strengths of the members transmitting the reverse torque can be small and, accordingly, the weights and sizes of these members can be reduced. Thus, a five-speed automatic transmission, which is superior in size, weight and mountability to the conventional five-speed automatic transmission is provided, utilizing a conventional four-speed automatic transmission without any remarkable increase in its size and weight.

Figure 5:
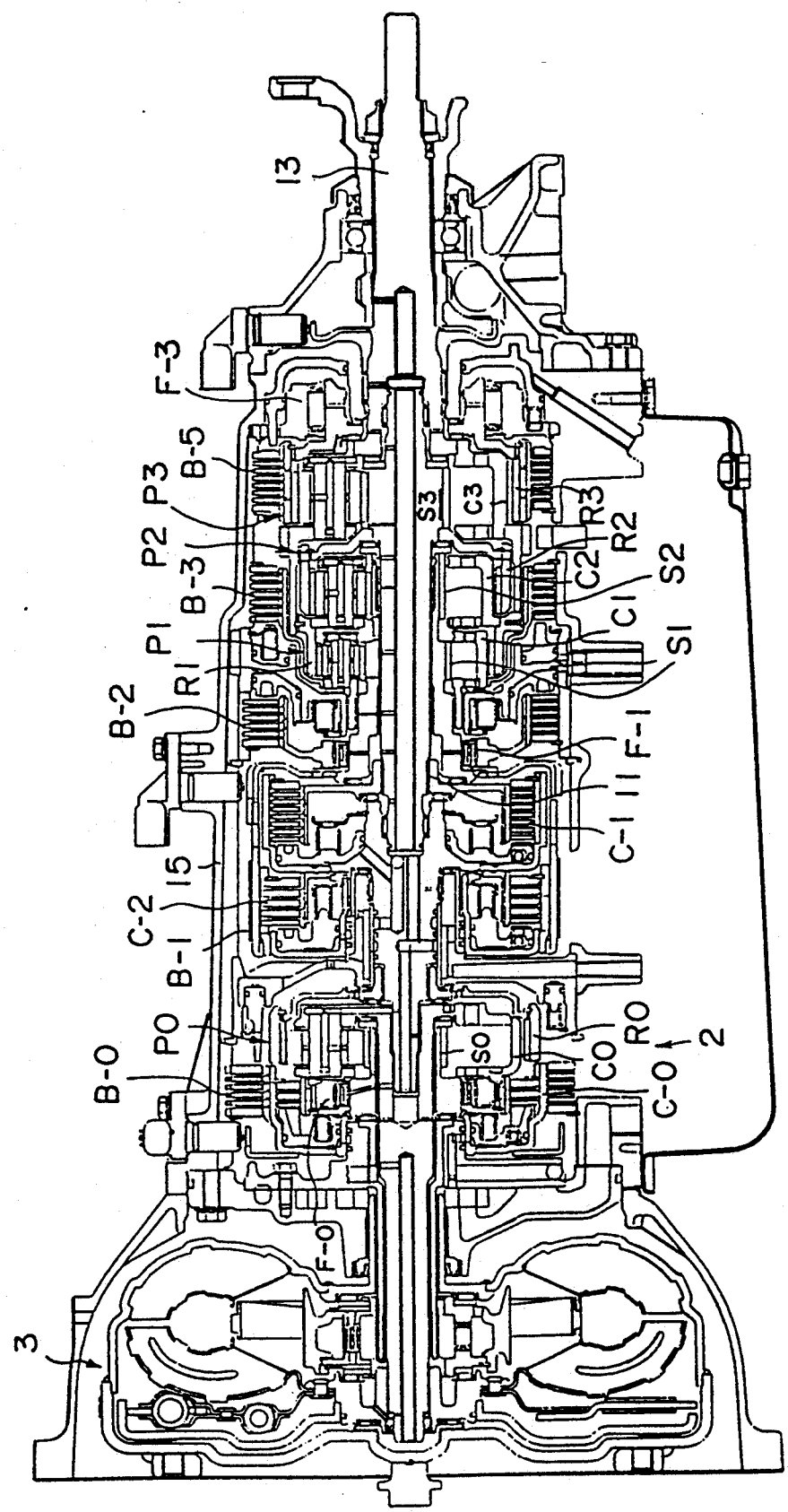
FIG. 5 is a cross-sectional view showing the overall construction of a second embodiment.

FIG. 5 shows a second embodiment of the invention, in which the brake B-4 and the one-way clutch F-2 of the first embodiment are eliminated, and the brake B-2 and the one-way clutch F-1 are transposed to the positions brake B-4 and clutch F-2 occupied in the first embodiment, so that the weight and size are further reduced. Since the structures of the other portions of this second embodiment are similar to those of the first embodiment the corresponding portions and members bear the same reference numerals and will not be described.

Figure 6:
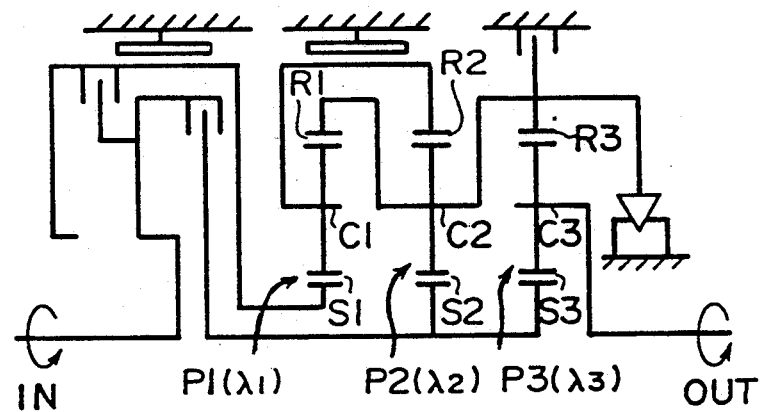
FIG. 6 is a skeletal diagram showing a modification of the gear trains of the main transmission.
Figure 7:
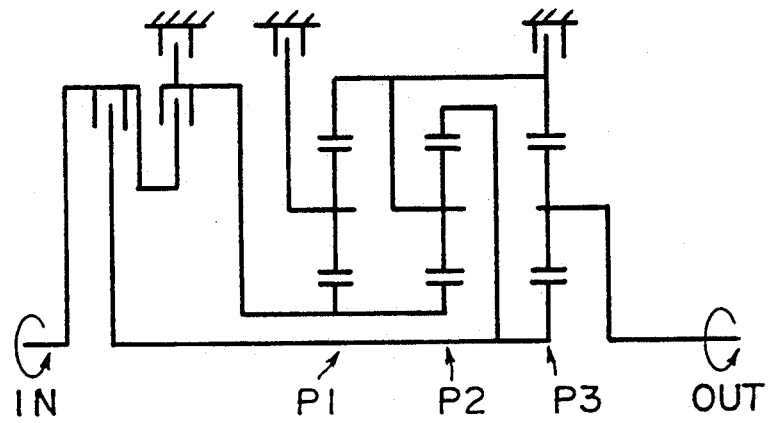
FIG. 7 is a skeletal diagram showing another modification of the gear trains of the main transmission.
Figure 8:
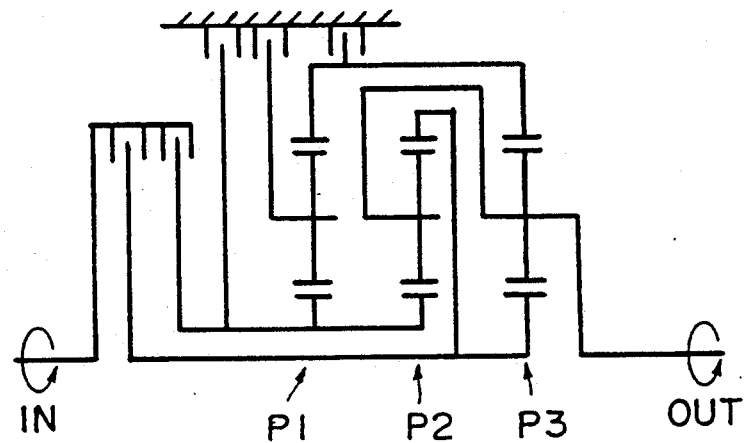
FIG. 8 is a skeletal diagram showing still another modification of the gear trains of the main transmission.

Although the invention has been described with reference to several specific embodiments, the invention is not restricted to these embodiments, and may employ various modifications without departing from the spirit and scope of the invention as defined by the appended claims. For example, the gear trains of the main transmission may have any of the configurations which are schematically shown in diagrams of FIGS. 6-8. The reference numerals and characters in these figures designate portions and members similar to those of the first embodiment bearing the same reference numerals and characters.

We claim:

1. A five-speed automatic transmission comprising:
   a main transmission which includes an input element and three sets of planetary gearing including speed change elements, clutches for engaging and disengaging said speed-change elements and brakes for fixing and releasing said speed change elements, said main transmission providing four forward speed ranges and one reverse speed range; and
   an over-drive transmission of a front disposition type which includes an over-drive planetary gearing set having a speed change element connected to the input element of said main transmission, said speed change element of said overdrive planetary gearing set being adapted to be engaged, disengaged and fixed to selectively provide one of a directly coupled stage and an over-drive stage; said directly coupled stage being released in said reverse speed range; and one of said clutches of said main transmission being engageable to establish said directly coupled stage and one of said brakes being engageable for establishing said reverse speed range.

* * * * *